(12) United States Patent
Xiao (10) Patent No.: US 9,785,363 B2
(45) Date of Patent: Oct. 10, 2017

(54) FILE QUARANTINE METHOD AND APPARATUS

(71) Applicant: Tencent Technology (Shenzhen) Co., Ltd., Shenzhen, Guangdong (CN)

(72) Inventor: Quanju Xiao, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 106 days.

(21) Appl. No.: 14/807,241

(22) Filed: Jul. 23, 2015

(65) Prior Publication Data

US 2015/0324146 A1 Nov. 12, 2015

Related U.S. Application Data

(63) Continuation of application No. PCT/CN2013/086221, filed on Oct. 30, 2013.

(30) Foreign Application Priority Data

Jan. 28, 2013 (CN) .......................... 2013 1 0032866

(51) Int. Cl.
*G06F 21/00* (2013.01)
*G06F 3/06* (2006.01)
(Continued)

(52) U.S. Cl.
CPC ............ *G06F 3/0619* (2013.01); *G06F 3/068* (2013.01); *G06F 3/0643* (2013.01);
(Continued)

(58) Field of Classification Search
USPC ........................................................ 726/22
See application file for complete search history.

(56) References Cited

U.S. PATENT DOCUMENTS

| 8,180,893 B1* | 5/2012 | Spertus | ................... G06F 21/52 |
| | | | 709/200 |
| 9,111,089 B1* | 8/2015 | Bhatia | ..................... G06F 21/00 |
| 2006/0021029 A1* | 1/2006 | Brickell | .................. G06F 21/51 |
| | | | 726/22 |

FOREIGN PATENT DOCUMENTS

| CN | 101847184 A | 9/2010 |
| CN | 102004886 A | 4/2011 |

(Continued)

OTHER PUBLICATIONS

International Search Report received in PCT Application No. PCT/CN2013/086221 dated Jan. 9, 2014.

(Continued)

*Primary Examiner* — Jason Lee
(74) *Attorney, Agent, or Firm* — Brinks Gilson & Lione (57) ABSTRACT

The present disclosure provides a file quarantine method, apparatus, and system. The method includes: receiving by an input/output (I/O) object manager, a change operation request from a first process for a volume device in a file system; and if it is determined that the first process is a process inside a sandbox, redirecting the change operation request to a virtual volume device corresponding to the volume device which is pointed to by the change operation request, and sending the redirected change operation request to the I/O object manager. The foregoing solution may implement file quarantine at a volume device level.

10 Claims, 5 Drawing Sheets

(51) Int. Cl.
*G06F 21/53* (2013.01)
*G06F 17/30* (2006.01)

(52) U.S. Cl.
CPC ...... *G06F 3/0665* (2013.01); *G06F 17/30233* (2013.01); *G06F 21/53* (2013.01)

(56) References Cited

FOREIGN PATENT DOCUMENTS

| CN | 102708326 A | 10/2012 |
|---|---|---|
| CN | 102821094 A | 12/2012 |

OTHER PUBLICATIONS

Office Action dated Feb. 23, 2017 for Chinese Application No. 201310032866.6, 23 pages.
Office Action dated Jun. 6, 2017 for Chinese Application No. 201310032866.6, 20 pages.

\* cited by examiner

FILE QUARANTINE METHOD AND APPARATUS

CROSS-REFERENCES TO RELATED APPLICATIONS

This application is a continuation of PCT/CN2013/086221, filed on Oct. 30, 2013, which claims priority to Chinese Patent Application No. 201310032866.6, filed with the Chinese Patent Office on Jan. 28, 2013 and titled "FILE QUARANTINE METHOD, APPARATUS, AND SYSTEM", which are incorporated herein by reference in their entireties.

FIELD OF THE TECHNOLOGY

The subject matter disclosed herein relates to the field of communications technologies.

BACKGROUND OF THE DISCLOSURE

A file quarantine technology is widely used in a sandbox, so that a modification made to a system by an application program inside the sandbox is quarantined and produces no influence on the system. For example, if a process of an application program inside a sandbox creates a file Virus.exe in a directory C:\Windows, the file Virus.exe can be detected by the process inside the sandbox but does not exist in the directory C:\Windows of the system. Current file quarantine technology has problems including high complexity or low security.

SUMMARY

A file quarantine method, apparatus, and system are provided, to solve at least one of the problems.

According to an implementation solution of the present disclosure, a file quarantine method includes:

receiving by an input/output (I/O) object manager, a change operation request from a first process for a volume device in a file system; and determining whether the first process is a process inside a sandbox, if the first process is a process inside the sandbox, redirecting the change operation request to a virtual volume device corresponding to the volume device which is pointed to by the change operation request, and sending the redirected change operation request to the I/O object manager.

According to another implementation solution of the present disclosure, a file quarantine method includes:

receiving a change operation request from a first process for a volume device in a file system; and sending the change operation request to a registration file filter driver, and receiving a redirected change operation request returned by the registration file filter driver after the registration file filter driver determining that the first process is a process inside a sandbox, wherein the change operation request is redirected to a virtual volume device corresponding to the volume device which is pointed to by the change operation request.

According to an implementation solution of the present disclosure, a file quarantine apparatus includes one or more processors and a memory having processor-executable instructions stored therein, and the instructions when executed by the one or more processor, configure the apparatus to:

use an I/O object manager to receive a change operation request from a first process for a volume device in a file system;

determine whether the first process is a process inside a sandbox;

if the process determination unit determines that the first process is a process inside the sandbox:

redirect the change operation request to a virtual volume device corresponding to the volume device which is pointed to by the change operation request; and send the redirected change operation request to the I/O object manager.

According to another implementation solution of the present disclosure, a file quarantine apparatus includes one or more processors and a memory having a plurality of processor-executable instruction units stored therein, where the instruction units include:

a first request receiving unit, configured to receive a change operation request, for a volume device in a file system, from a first process;

a first request sending unit, configured to send, to a registration file filter driver, the change operation request received by the request receiving unit;

a second request receiving unit, configured to receive a redirected change operation request returned by the registration file filter driver after the registration file filter driver determines that the first process is a process inside a sandbox, wherein the change operation request is redirected to a virtual volume device corresponding to the volume device pointed to by the change operation request a second request sending unit, configured to send, to a virtual file system where a virtual volume device pointed to by the redirected change operation request is located, where the redirected change operation request received by the second request receiving unit.

According to an implementation solution of the present disclosure, a file quarantine system includes:

an I/O object manager, configured to receive a change operation request, for a volume device in a file system, from a first process; send the change operation request to a registration file filter driver, and receive a redirected change operation request returned by the registration file filter driver after the registration file filter driver determines that the first process is a process inside a sandbox; and send the redirected change operation request to a virtual file system where a virtual volume device pointed to by the redirected change operation request is located;

a registration file filter driver, configured to receive, by using the I/O object manager, the change operation request, for the volume device in the file system, from the first process; and determine whether the first process is a process inside a sandbox, redirect, if the first process is a process inside a sandbox, the change operation request to the virtual volume device corresponding to the volume device pointed to by the change operation request, and send the redirected change operation request to the I/O object manager; and a virtual file system, configured to send the received redirected change operation request to the virtual volume device corresponding to the redirected change operation request.

It can be seen from the foregoing technical solutions that embodiments of the present invention have the following advantage: A redirection capability of an I/O object manager and a volume virtualization technology are used to determine whether an initiator of an I/O request is a process inside a sandbox before the I/O request reaches a volume device, so as to determine, at a volume device level, whether an original initiator of an I/O request is a process inside a sandbox; therefore, file quarantine at a volume device level is implemented.

BRIEF DESCRIPTION OF THE DRAWINGS

To describe the technical solutions in the embodiments of the present invention more clearly, the following briefly introduces the accompanying drawings required for describing the embodiments.

DESCRIPTION OF EMBODIMENTS

To make the objectives, technical solutions, and advantages of the present disclosure clearer, the following further describes the present disclosure in detail with reference to the accompanying drawings. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Throughout the disclosure of the embodiments, the term "volume device" may be understood by a person of ordinary skill in the art to refer to any portion of a physical memory or a storage device (which may be a RAM, a magnetic hard disk, a solid state hard disk or an optical disk drive) in a host or file storage system. The term "virtual volume device" may be referred to a logical portion on the volume device. The term "sandbox" may be referred to the logical portion on the volume device which has been partitioned or dedicated to temporarily store downloaded data file which may potentially cause harm to the host device or file storage system, or may corrupt one or more process (client) run by the host device or file storage system, wherein the downloaded data file in the sandbox is to be further modified or disposed.

According to an implementation solution of the present disclosure, a solution for solving the foregoing technical problems at a volume device level is proposed. As shown in the schematic diagram of FIG. 1, the solution at a volume device level includes steps S101 to S103.

Figure 1:
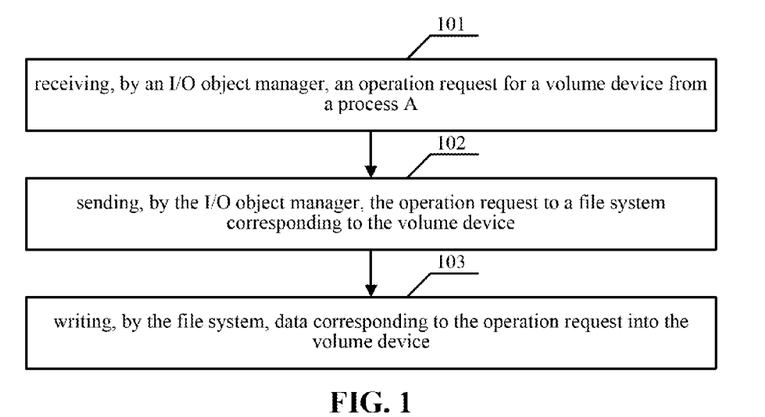
FIG. 1 is a flowchart of a method in a solution at a volume device level according to a first embodiment of the present disclosure.

Step S101 may include receiving, by an I/O object manager, an operation request for a volume device from a process A, where the operation request is, for example, a change operation request. The change operation may be an operation for changing data of the volume device, for example, creating or modifying data of the volume device, and a specific of operation is not limited in the embodiment of the present disclosure. For example, the process A requests an operation on a volume device C:\, for example, creating a file C:\1.txt.

Step S102 may include: sending, by the I/O object manager, the operation request to a file system corresponding to the volume device such as C:\, after a series of operations.

Step S103 may include: writing, by the file system, into the volume device such as C:\ in a synchronous or an asynchronous manner, data corresponding to the operation request, after the operation request is processed.

If the data corresponding to the operation request is written in the asynchronous manner in step S103, a system process is obtained after the volume device C:\ obtains the request. Therefore, difficulty exists in performing file quarantine at a volume device level: in a quarantine solution at a volume device level, it cannot be determined whether an original initiator of an I/O request is a process in a sandbox, and therefore the quarantine operation cannot be implemented.

Figure 2:
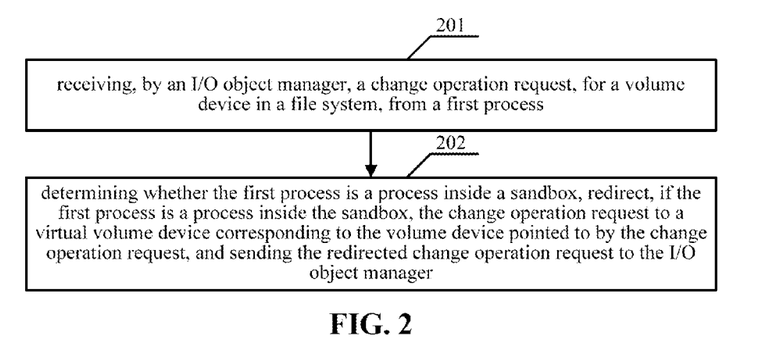
FIG. 2 is a flowchart of a method according to a second embodiment of the present invention.

Therefore, according to a second embodiment of the present disclosure, a file quarantine method is provided. In an exemplary implementation, the method may be implemented in an I/O object manager or a registration file filter driver having a filtering function. As shown in FIG. 2, the file quarantine method includes steps S201 and S202.

Step S201 may include: receiving, by an I/O object manager, a change operation request, for a volume device in a file system, from a first process.

The change operation may be any change operation on a file or data in a volume device in a file system. Generally, the operation may be for creating a file, modifying data, and the like, and the operation is not limited in the embodiments of the present disclosure.

Step S202 may include: determining whether the first process is a process inside a sandbox; redirecting, if the first process is a process inside the sandbox, the change operation request to a virtual volume device corresponding to the volume device pointed to by the change operation request, and sending the redirected change operation request to the I/O object manager.

In the embodiment, a redirection capability of an I/O object manager and a volume virtualization technology are used to determine whether an initiator of an I/O request is a process inside a sandbox before the I/O request reaches a volume device, to determine, at a volume device level, whether an initiator of an I/O request is a process inside a sandbox; therefore, file quarantine at a volume device level is implemented.

Further, the method further includes: sending, if the first process is not a process inside the sandbox, the change operation request to a file system where the volume device pointed to by the change operation request is located.

According to an exemplary implementation solution of the present disclosure, the method may further include: receiving, by an I/O object manager, a read operation request, for the volume device in the file system, from a second process; redirecting, if it is determined that the second process is a process inside a sandbox, the read operation request to a virtual volume device corresponding to the volume device pointed to by the read operation request; and sending the redirected read operation request to the I/O object manager.

Further, the method may further include: sending, if it is determined that the second process is not a process inside the sandbox, the read operation request to a file system where the volume device pointed to by the read operation request is located.

Figure 3:
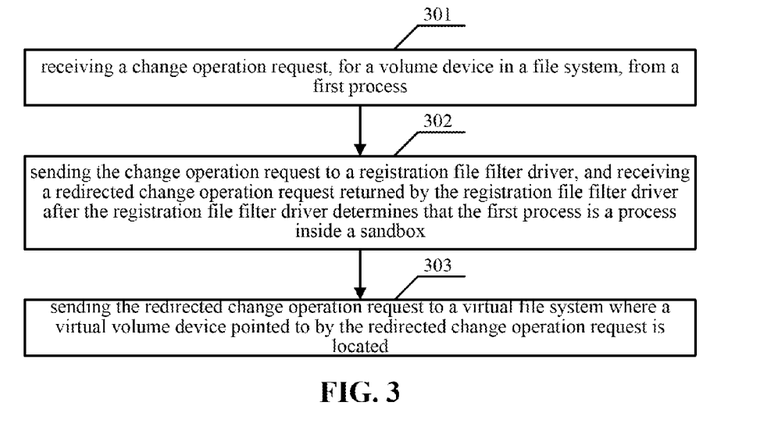
FIG. 3 is a flowchart of a method according to a third embodiment of the present disclosure.

According to a third embodiment of the present disclosure, another file quarantine method is further provided. According to an exemplary implementation, the method may be implemented in a registration file filter driver having a filtering function or an I/O object manager. As shown in FIG. 3, the file quarantine method includes steps S301 and S302.

Step S301 may include: receive a change operation request, for a volume device in a file system, from a first process.

The change operation may be any change operation on a file or data in a volume device in a file system, generally, the operation may be for creating a file, modifying data, and the like, and the operation is not limited in the embodiments of the present disclosure.

Step S302 may include: sending the change operation request to a registration file filter driver, and receiving a redirected change operation request returned by the registration file filter driver after the registration file filter driver determines that the first process is a process inside a sandbox, where the change operation request is redirected to a virtual volume device corresponding to the volume device pointed to by the change operation request.

In this step, reference may be made to the foregoing description for the specific implementation of how a registration file filter driver determines whether the first process is a process inside a sandbox, which is not repeated again herein.

According to an exemplary implementation of the present disclosure, the method may further include: sending the redirected change operation request to a virtual file system where the virtual volume device pointed to by the redirected change operation request is located.

In the embodiment, a redirection capability of a filter driver and a volume virtualization technology are used to determine whether an initiator of an I/O request is a process inside a sandbox before the I/O request reaches a volume device, to determine, at a volume device level, whether an initiator of an I/O request is a process inside a sandbox; therefore, file quarantine at a volume device level is implemented.

According to an exemplary implementation solution of the present disclosure, the method may further include:

receiving a read operation request, for the volume device in the file system, from a second process.

sending the read operation request to the registration file filter driver, and receiving a redirected read operation request returned by the registration file filter driver after the registration file filter driver determines that the second process is a process inside the sandbox, where the read operation request is redirected to a virtual volume device corresponding to the volume device pointed to by the read operation request.

Subsequently, the redirected read operation request may be sent to a virtual file system where the virtual volume device pointed to by the redirected read operation request is located.

Figure 4:
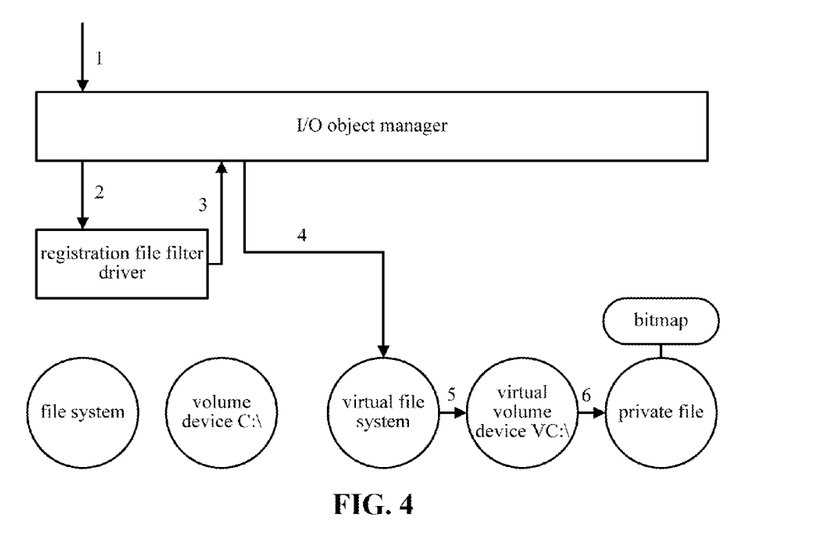
FIG. 4 is a schematic diagram of a data flow according to an embodiment of the present disclosure.
Figure 5:
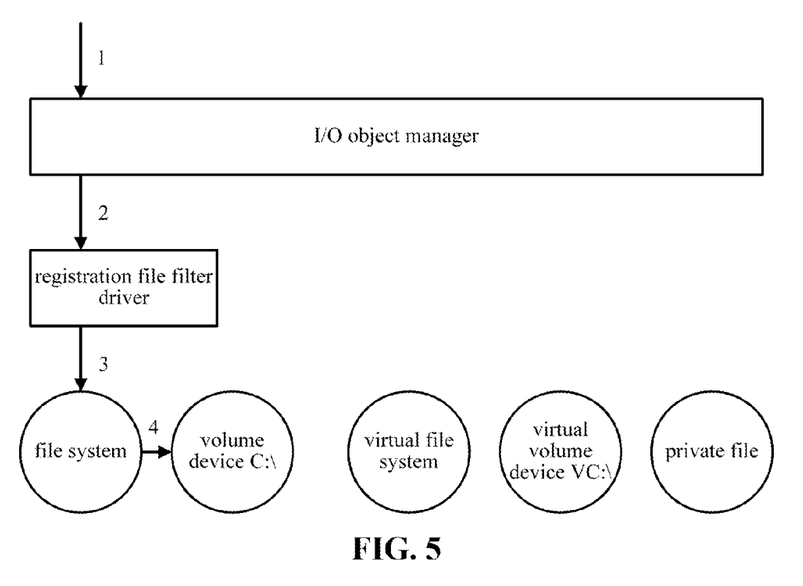
FIG. 5 is a schematic diagram of a data flow according to another embodiment of the present disclosure.
Figure 6:
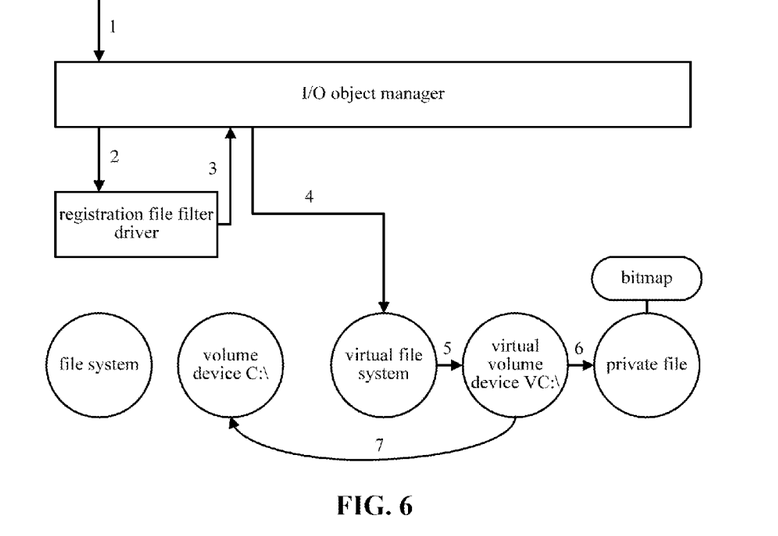
FIG. 6 is a schematic diagram of a data flow according to still another embodiment of the present disclosure.

The following description is provided with the focus on the flow of a request. A redirection capability of an I/O object manager and a volume virtualization technology are used to determine, at a volume device level, whether an original initiator of an I/O request is a process inside a sandbox, to implement file quarantine at a volume device level. All volume devices of a system are enumerated, and a virtual volume device is created for each volume device. For example, as shown in FIG. 4 to FIG. 6, a virtual volume device VC:\ is created for a volume device C:\. A registration file filter driver is used to monitor an operation on a file within the range of a file system.

FIG. 4 shows a case that a process inside a sandbox initiates a change operation request for a file on a volume device C:\. As shown in FIG. 4, the data flow includes steps 1 to 6.

In step 1, process A initiates an I/O request for changing a file C:\1.txt on the volume device C:\ (that is, a change operation request) in step S1.

In step 2, an I/O object manager sends the change operation request to a registration file filter driver, after receiving the request and performing related processing.

In step 3, the registration file filter driver determines that the process A is a process inside a sandbox, redirects the change operation request to a virtual volume device VC:\ by using a redirection mechanism of the I/O object manager, and transfers the control right to the I/O object manager again.

In step 4, after performing related processing, the I/O object manager sends the redirected change operation request to a virtual file system corresponding to the virtual volume device VC:\.

In step 5, the virtual file system sends the redirected change operation request to the virtual volume device VC:\ in a synchronous or an asynchronous manner.

In step 6, after receiving the redirected change request, the virtual volume device determines that an original initiator of the current I/O request is a process inside the sandbox, so that the virtual volume device VC:\ may not write operation content of the current change operation request to the real volume device C:\, and instead, writes operation content of the current change operation request to a private file and records content of the current change operation on a private bitmap.

FIG. 5 shows a case that a process that is not inside a sandbox initiates a change operation request for a file on a volume device C:\. As shown in FIG. 5, the data flow includes steps 1 to 4.

In step 1, process A initiates an I/O request for changing a file C:\1.txt on a volume device C:\ (that is, a change operation request).

In step 2, after receiving the request and performing related processing, an I/O object manager sends the change operation request to a registration file filter driver.

In step 3, the registration file filter driver determines that the process A is a process that is not inside a sandbox and skips processing, and directly sends the request to a file system.

In step 4, the file system sends the I/O request to the volume device C:\ in a synchronous or an asynchronous manner.

FIG. 6 shows a case that a process inside a sandbox reads a file on a volume device C:\. As shown in FIG. 6, the data flow includes steps 1 to 7.

In step 1, process A initiates an I/O request for reading a file C:\1.txt on a volume device C:\ (that is, a read operation request).

In step 2, after receiving the request and performing related processing, an I/O object manager sends the read operation request to a registration file filter driver.

In step 3, the registration file filter driver determines that the process A is a process inside a sandbox, redirects the read operation request to a virtual volume device VC:\ by using a redirection mechanism of the I/O object manager, and transfers the control right to the I/O object manager again.

In step 4, after performing related processing, the I/O object manager sends the redirected read operation request to a virtual file system corresponding to the virtual volume device VC:\ in step S4.

In step 5, the virtual file system sends the redirected read operation request to the virtual volume device VC:\ in a synchronous or an asynchronous manner.

In step 6, after receiving the redirected read operation request, the virtual volume device VC:\ determines that an original initiator of the read operation request is a process inside a sandbox, checks a bitmap record to find whether a current reading range is within a private file, performs reading, if the reading range is within a private file, from the private file.

In step 7, the virtual volume device VC:\ performs reading, if the reading range is not within a private file, from the real volume device C:\.

Figure 7:
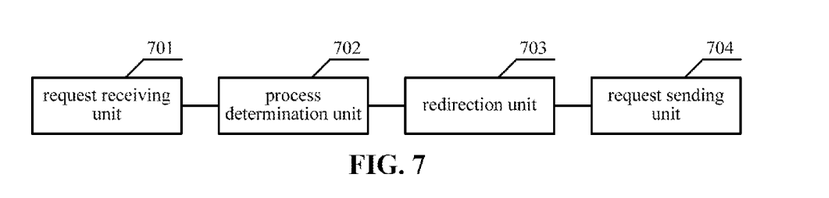
FIG. 7 is a schematic structural diagram of an apparatus according to a fourth embodiment of the present disclosure.

According to a fourth embodiment of the present disclosure, a file quarantine apparatus is further provided, as shown in FIG. 7, including:

a request receiving unit 701, configured to receive, by using an I/O object manager, a change operation request, for a volume device in a file system, from a first process;

a process determination unit 702, configured to determine whether the first process is a process inside a sandbox;

a redirection unit 703, configured to redirect, if the process determination unit 702 determines that the first process is a process inside a sandbox, the change operation request to a virtual volume device corresponding to the volume device pointed to by the change operation request; and a request sending unit 704, configured to send, to the I/O object manager, the change operation request redirected by the redirection unit 703.

In this embodiment, a redirection capability of an I/O object manager and a volume virtualization technology are used to determine whether an initiator of an I/O request is a process inside a sandbox before the I/O request reaches a volume device, so as to determine, at a volume device level, whether an original initiator of an I/O request is a process inside a sandbox; therefore, file quarantine at a volume device level is implemented.

Further, in the file quarantine apparatus according to the embodiment of the present disclosure, the request sending unit 704 may further be configured to send, if the process determination unit 702 determines that the first process is not a process inside a sandbox, the change operation request to a file system where the volume device pointed to by the change operation request is located.

Further, in a file quarantine apparatus according to the embodiment of the present disclosure, the request receiving unit 701 may further be configured to receive, by using an I/O object manager, a read operation request, for the volume device in the file system, from a second process;

the process determination unit 702 may further be configured to determine whether the second process is a process inside a sandbox;

the redirection unit 703 may further be configured to redirect, if the process determination unit 702 determines that the second process is a process inside a sandbox, the read operation request to the virtual volume device corresponding to the volume device pointed to by the read operation request; and the request sending unit 704 may further be configured to send, to the I/O object manager, the read operation request redirected by the redirection unit 703.

Further, in the file quarantine apparatus according to the embodiment of the present disclosure, the request sending unit 704 may further be configured to send, if the process determination unit 702 determines that the second process is not a process inside a sandbox, the read operation request to a file system where the volume device pointed to by the read operation request is located.

Figure 8:
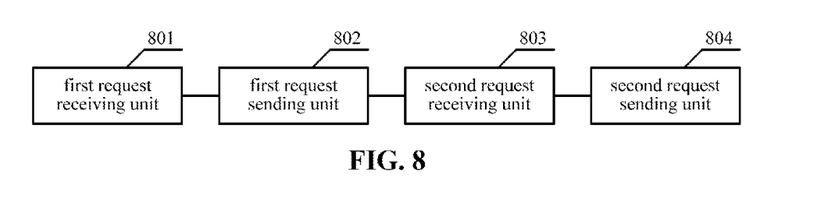
FIG. 8 is a schematic structural diagram of an apparatus according to a fifth embodiment of the present disclosure.

According to a fifth embodiment of the present disclosure, a file quarantine apparatus is further provided, as shown in FIG. 8, the file quarantine apparatus includes:

a first request receiving unit 801, configured to receive a change operation request, for a volume device in a file system, from a first process;

a first request sending unit 802, configured to send, to a registration file filter driver, the change operation request received by the request receiving unit; and a second request receiving unit 803, configured to receive a redirected change operation request returned by the registration file filter driver after the registration file filter driver determines that the first process is a process inside a sandbox, where the change operation request is redirected to a virtual volume device corresponding to the volume device pointed to by the change operation request.

According to an exemplary implementation of the present disclosure, the file quarantine apparatus may further include a second request sending unit 804, configured to send, to a virtual file system where the virtual volume device pointed to by the redirected change operation request is located, the redirected change operation request received by the second request receiving unit 803.

In this embodiment, a redirection capability of an I/O object manager and a volume virtualization technology are used to determine whether an initiator of an I/O request is a process inside a sandbox before the I/O request reaches a volume device, to determine, at a volume device level, whether an original initiator of an I/O request is a process inside a sandbox; therefore, file quarantine at a volume device level is implemented.

Further, in the file quarantine apparatus according to the embodiment of the present disclosure, the first request receiving unit 801 may further be configured to receive a read operation request, for the volume device in the file system, from a second process;

the first request sending unit 802 may further be configured to send the read operation request to the registration file filter driver;

the second request receiving unit 803 may further be configured to receive a redirected read operation request returned by the registration file filter driver after the registration file filter driver determines that the second process is a process inside the sandbox; and the second request sending unit 804 may further be configured to send, to a virtual file system where the virtual volume device pointed to by the redirected read operation request is located, the redirected read operation request received by the second request receiving unit 803.

Figure 9:
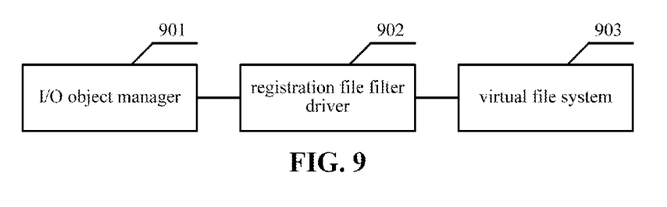
FIG. 9 is a schematic structural diagram of a system according to a sixth embodiment of the present disclosure.

According to a sixth embodiment of the present disclosure, a file quarantine system is further provided, as shown in FIG. 9, the file quarantine includes an I/O object manager 901, a registration file filter driver 902, and a virtual file system 903, where:

the I/O object manager 901 is configured to receive a change operation request, for a volume device in a file system, from a first process; send the change operation request to a registration file filter driver 902, and receive a redirected change operation request returned by the registration file filter driver 902 after the registration file filter driver 902 determines that the first process is a process inside a sandbox; and send the redirected change operation request to the virtual file system 903 where the virtual volume device pointed to by the redirected change operation request is located;

the registration file filter driver 902 is configured to receive, by using the I/O object manager 901, the change operation request, for the volume device in the file system, from the first process; and determine whether the first process is a process inside a sandbox; redirect, if the first process is a process inside a sandbox, the change operation request to the virtual volume device corresponding to the volume device pointed to by the change operation request; and send the redirected change operation request to the I/O object manager 901; and the virtual file system 903 is configured to send the received redirected change operation request to the virtual volume device corresponding to the redirected change operation request.

In this embodiment, a redirection capability of an I/O object manager and a volume virtualization technology are used to determine whether an initiator of an I/O request is a process inside a sandbox before the I/O request reaches a volume device, to determine, at a volume device level, whether an original initiator of an I/O request is a process inside a sandbox; therefore, file quarantine at a volume device level is implemented.

Figure 10:
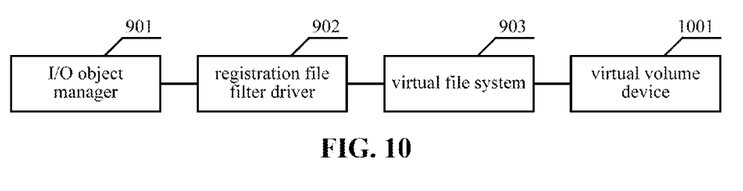
FIG. 10 is a schematic structural diagram of a system according to a seventh embodiment of the present disclosure.

Further, according to a seventh embodiment of the present disclosure, a processing solution after a virtual volume device receives a change operation request initiated by a process inside a sandbox is further provided. A difference between the sixth embodiment shown in FIG. 9 and the seventh embodiment lies in that, as shown in FIG. 10, the system further includes:

a virtual volume device 1001, configured to perform the redirected operation request on a private file in the virtual volume device 1001 pointed to by the redirected change operation request, and record a current change operation in a bitmap.

In this embodiment, it is determined at a volume device level that an original initiator of an I/O request is a process inside a sandbox, so that file quarantine at a volume device level may be implemented.

Further, the present disclosure further provides an implementation solution of a read operation request. According to an exemplary implementation, the I/O object manager 901 may further be configured to receive a read operation request, for the volume device in the file system, from a second process; send the read operation request to the registration file filter driver 902, and receive a redirected read operation request returned by the registration file filter driver 902 after the registration file filter driver 902 determines that the second process is a process inside a sandbox; and send the redirected read operation request to the virtual file system 903 where the virtual volume device 1001 pointed to by the redirected read operation request is located; and the virtual file system 903 may further be configured to send the received redirected read operation request to the virtual volume device 1001 corresponding to the redirected read operation request.

According to another exemplary implementation of the present disclosure, the virtual volume device 1001 may further be configured to determine whether a reading range of the redirected read operation request is within the recorded bitmap; perform, if the reading range of the redirected read operation request is within the recorded bitmap, the redirected read operation request on the private file within the virtual volume device 1001 pointed to by the redirected read operation request; and perform, if the reading range of the redirected read operation request is not within the recorded bitmap, the redirected read operation request on the volume device corresponding to the virtual volume device 1001 pointed to by the redirected read operation request.

It should be noted that in the foregoing description, units included in each foregoing apparatus embodiment are divided according to functional logic, but the present disclosure is not limited to the foregoing division, as long as corresponding functions can be implemented; in addition, names of functional units are merely provided for the convenience of distinguishing the units from one another, but not intended to limit the protection scope of the present disclosure.

In addition, a person of ordinary skill in the art may understand that all or some of the steps of the embodiments of each method may be implemented by a program instructing relevant hardware such as a processor or a central processing unit (CPU). The program may be stored in a non-transitory computer-readable storage medium. The non-transitory computer-readable storage medium may be a read-only memory, a flash memory, a RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the appended claims.

What is claimed is:

1. A file quarantine method, comprising:
   executing by a hardware processor, an algorithm stored in a storage memory to perform in conjunction with the storage memory, the following:
   receiving by an input/output (I/O) object manager, a change operation request from a first process for a volume device in a file system;
   determining whether the first process is a process inside a sandbox;
   in response to the first process being a process inside the sandbox, redirecting the change operation request to a virtual volume device in a virtual file system, the virtual volume device corresponding to the volume device which is pointed to by the change operation request;
   sending the redirected change operation request to the I/O object manager; and
   sending the redirected change operation request to the virtual file system which in turn send the redirected change operation request to the virtual volume device, wherein the virtual volume device writes operation content of the change operation request to a private file and records the operation content of the change operation request on a private bitmap.

2. The method according to claim 1, further comprising:
in response to the first process being not a process inside the sandbox, sending the change operation request to a file system to where the volume device is pointed to by the change operation request is located.

3. The method according to claim 1, further comprising:
receiving by the I/O object manager, a read operation request from a second process for the volume device in the file system;
in response to the second process being a process inside the sandbox, redirecting the read operation request to a virtual volume device corresponding to the volume device which is pointed to by the read operation request; and
sending the redirected read operation request to the I/O object manager.

4. The method according to claim 3, further comprising:
in response to the second process being not a process inside the sandbox, sending the read operation request to a file system to where the volume device is pointed to by the read operation request is located.

5. A file quarantine method, comprising:
executing by a hardware processor, an algorithm stored in a storage memory to perform in conjunction with the storage memory, the following:
receiving a change operation request from a first process for a volume device in a file system;
sending the change operation request to a registration file filter driver;
receiving a redirected change operation request returned by the registration file filter driver in response to the registration file filter driver determining that the first process is a process inside a sandbox, wherein the change operation request is redirected to a virtual volume device in a virtual file system, the virtual volume device corresponding to the volume device which is pointed to by the change operation request; and
sending the redirected change operation request to the virtual file system which in turn send the redirected change operation request to the virtual volume device, wherein the virtual volume device writes operation content of the change operation request to a private file and records the operation content of the change operation request on a private bitmap.

6. The method according to claim 5, further comprising:
receiving a read operation request from a second process for the volume device in the file system;
sending the read operation request to the registration file filter driver;
receiving a redirected read operation request returned by the registration file filter driver in response to the registration file filter driver determining that the second process is a process inside the sandbox; and
sending the redirected read operation request to the virtual file system.

7. A file quarantine apparatus, comprising one or more hardware processors and a memory having processor-executable instructions stored therein, and the instructions when executed by the one or more processor, configure the apparatus to:
use an input/output (I/O) object manager to receive a change operation request from a first process for a volume device in a file system;
determine whether the first process is a process inside a sandbox;
in response to the first process being a process inside the sandbox, redirect the change operation request to a virtual volume device in a virtual file system, the virtual volume device corresponding to the volume device which is pointed to by the change operation request;
send the redirected change operation request to the I/O object manager; and
send the redirected change operation request to the virtual file system which in turn send the redirected change operation request to the virtual volume device, wherein the virtual volume device writes operation content of the change operation request to a private file and records the operation content of the change operation request on a private bitmap.

8. The apparatus according to claim 7, wherein the apparatus is further configured to:
in response to the first process being not a process inside the sandbox, send the change operation request to a file system to where the volume device is pointed to by the change operation request is located.

9. The apparatus according to claim 7, wherein the apparatus is further configured to:
use the I/O object manager to receive a read operation request from a second process for the volume device in the file system;
determine whether the second process is a process inside the sandbox;
in response to the second process being a process inside the sandbox, redirect the read operation request to the virtual volume device corresponding to the volume device which is pointed to by the read operation request; and
send the redirected read operation request to the I/O object manager.

10. The apparatus according to claim 9, wherein the apparatus is further configured to:
in response to the second process being not a process inside the sandbox, send the read operation request to a file system to where the volume device is pointed to by the read operation request is located.

* * * * *